United States Patent [19]

Petersen

[11] Patent Number: 5,103,171
[45] Date of Patent: Apr. 7, 1992

[54] ADAPTIVE MEASURING APPARATUS WITH AUTOMATICALLY ADJUSTABLE WINDOW COMPARATOR

[75] Inventor: August Petersen, Henstedt-Ulzburg, Fed. Rep. of Germany

[73] Assignee: U.S. Philips Corporation, New York, N.Y.

[21] Appl. No.: 562,526

[22] Filed: Aug. 3, 1990

[30] Foreign Application Priority Data

Aug. 11, 1989 [DE] Fed. Rep. of Germany ....... 3926617

[51] Int. Cl.⁵ ............................ G01B 7/30; G01P 3/56
[52] U.S. Cl. ................................. 324/207.23; 324/161
[58] Field of Search ............ 324/207.11, 207.12, 324/207.13, 207.22, 207.23, 207.25, 234–236, 239, 160–162, 166; 188/182; 303/91, 93–95

[56] References Cited

U.S. PATENT DOCUMENTS

| | | | |
|---|---|---|---|
| 4,095,179 | 6/1978 | Bremer et al. | 324/207.25 |
| 4,293,814 | 6/1981 | Boyer | 324/166 |
| 4,358,735 | 11/1982 | Boys | 324/207.25 |
| 4,359,717 | 11/1982 | Huber et al. | 324/162 |
| 4,761,609 | 8/1988 | Dorman et al. | 324/207.25 |
| 4,937,530 | 6/1990 | Vogt et al. | 324/160 |
| 4,951,300 | 8/1990 | Koike | 324/207.25 |

FOREIGN PATENT DOCUMENTS

| | | |
|---|---|---|
| 3115237 | 4/1989 | Fed. Rep. of Germany . |
| 0176556 | 10/1983 | Japan ............... 324/207.25 |

Primary Examiner—Kenneth A. Wieder
Assistant Examiner—Warren S. Edmonds
Attorney, Agent, or Firm—Bernard Franzblau

[57] ABSTRACT

An adaptive revolution-measuring apparatus which includes a magnetic revolution sensor and an apparatus for comparing and evaluating the sensor signal of the revolution sensor to generate a digital output signal ($U_A$) corresponding thereto, which despite large offset voltage tolerances and shifts uniquely identifies and evaluates the periodic sensor signal. The measuring apparatus contains a window comparator (17) with a controllable window as the apparatus for comparing which via at least one logic switching element (20, 21) drives a flip-flop (25) to produce the output signal ($U_A$). Further apparatus are provided downstream of the window comparator which continuously generate corresponding reference voltages ($U_{R1}$, $U_{R2}$) for the window comparator as a function of the raised or lowered values of the sensor signal.

12 Claims, 1 Drawing Sheet

ADAPTIVE MEASURING APPARATUS WITH AUTOMATICALLY ADJUSTABLE WINDOW COMPARATOR

BACKGROUND OF THE INVENTION

This invention relates to an adaptive revolution measuring apparatus comprising a revolution sensor and means for comparing and evaluating the sensor signal of the revolution sensor in order to generate a digital output signal corresponding thereto.

Sensors for temporally periodic signals, e.g. revolution sensors, which can be used with, e.g. anti-lock systems, anti-slip systems etc, generally deliver a relatively small, alternating sensor signal, onto which a direct voltage or offset voltage is superimposed. This alternating sensor signal, which is affected by fluctuations, is digitized via a comparator, i.e. converted into a rectangular signal corresponding thereto and fed to a further evaluation apparatus.

Measuring apparatuses of this type are known. They generally have a toothed wheel whose revolution signal is sensed via, for example, a magnetically operating revolution sensor. The sensor signal is then amplified and fed as an input signal to a comparator, downstream of which is an evaluation circuit for generating the output signal. It is possible to operate the comparator with a permanently set, i.e. constant reference voltage. However, this requires a substantial amount of effort for adjustment and high stability in all components, and for this reason a following reference voltage is frequently fed to the comparator. This following reference voltage is generally obtained via an RC element, but is effective only above a lower cut-off frequency.

This represents a substantial disadvantage in the case of, for example, anti-locking systems, anti-slip systems or tachometer transducers. As an example, an anti-locking system is consequently no longer effective when the speed of the vehicle to which it is fitted is below a few kilometers per hour. The wheels of the vehicle can thus also lock in this speed range.

An appropriate circuit is known from U.S. Pat. No. 4,293,814. This circuit likewise has a toothed wheel whose revolution signals are detected with the aid of a magnetically operating revolution sensor and fed to a downstream amplifier and to a comparator circuit and evaluation circuit in order to generate a digital output signal. The following reference voltage, which is also provided with this circuit, is obtained via two RC elements, which each use the signal shape of the alternating sensor signal to match the reference voltage. Because of the RC elements employed, this circuit also is subject to the disadvantage of not being effective below a lower cut-off frequency.

In order to avoid this problem, it is known to detect the signal shape of the sensor signal in a digital fashion, and use it for a following reference voltage. Although in the case of such a circuit no limiting lower cut-off frequency is present, there is the disadvantage that it is necessary before the start to detect one to two signal periods in order to detect the signal level. An appropriate circuit requires a comparatively large design effort, and even possibly a processor and is therefore poorly suited for mass produced items because of its cost.

SUMMARY OF THE INVENTION

It is an object of the invention to provide an adaptive revolution-measuring apparatus which, even in the case of large offset voltage tolerances and shifts; uniquely identifies the sensor signal and has a construction which is simple and robust with respect to any disturbances.

This object is achieved according to the invention in that the means for comparing contain a window comparator with a controllable window which, via at least one logic switching element, drives a flip-flop to produce the output signal, and in that further means are provided downstream of the window comparator which continuously generate corresponding reference voltages for the window comparator as a function of the raised or lowered values of the sensor signal.

A preferred embodiment of the invention is characterized in that the window comparator comprises at least one first and one second comparator, in that an input signal proportional to the sensor signal is present at the negative input of the first and at the positive input of the second comparator, and in that reference voltages are present at the other inputs of the comparators and the output of the first and of the second comparator is connected to a first and a second logic switching element, respectively.

A further preferred embodiment is characterized in that each logic switching element is a NOR gate which is connected on the input side to a respective one of the comparators, on the output side to a respective input of the flip-flop, and on the input as well as on the output side to the means for generating the reference voltages.

In accordance with a further preferred embodiment of the invention, the means for generating the reference voltages comprise an oscillator which supplies the NOR gates with a clock pulse, a counter with a downstream DAC, and a first and a second adder. The up-counting input of the counter is connected to the output of the first NOR gate, and the down-counting input being connected to the output of the second NOR gate. The first adder adds to the output signal of the DAC a predetermined differential signal, and the resulting signal is present at the first comparator as a first reference voltage. The second adder subtracts the differential signal from the output signal of the DAC and feeds the resulting signal to the second comparator as a second reference voltage.

According to the invention, the input signal, which corresponds to the sensor signal, is consequently fed to the window comparator, which consists of two comparators. The reference voltages of these comparators result from a signal via the DAC, which corresponds to the counter content, and an additive and negative addition of a predetermined differential signal. When the apparatus is connected, there are three possible operating states in accordance with a random level of the input signal at the instant of connection. In one operating state, the levels of the outputs of the comparators are in the logic state ONE, and no activity takes place, i.e. the clock pulse of the oscillator does not pass to the following stages. In this operating state, the input signal falls in the window region of the comparator. The two other operating states arise when the input signal falls outside; the window region of the window comparator. In these cases, the clock pulse of the oscillator passes via one of the NOR gate elements to the counter. Depending upon whether the input signal falls above or below the window region, the counter counts either up or down until the downstream DAC transmits a signal which corresponds approximately to the input signal, so that once again a state is produced in which the input signal falls within the window region. Thus, the window comparator is "adapted" to the level of the input signal because the level of the window in the window comparator is shifted up or down as the mean level of the input signal $U_E$ shifts up or down.

During the further operation, the signal at the output of the DAC follows the input signal. If the input signal rises, this leads to a pulse series at the up-counting input of the counter, while a drop in the signal triggers a corresponding pulse series at the down-counting input of the counter. The change in direction upon reaching the minima or maxima of the input signal can therefore be detected with a simple flip-flop. The flip-flop is reversed in each case with the first pulse of an oppositely directed pulse series and thus generates the desired digitized output signal.

According to the invention, the measuring apparatus can be robustly dimensioned with respect to disturbing influences. If, e.g. small spurious signals which are pulse-type by nature are to be expected on the sensor signal, which can, e.g. arise through vibration of the mechanical construction, undesired switching can be prevented by means of a restricted resolution of the comparator window and of the DAC, since signals then are not detected below a limiting value.

In the case of very slow sensor signals, oscillations of the comparators can lead to instances of faulty switching. It is then possible advantageously to provide a regenerative resistor, which causes a switching hysteresis. The switching hysteresis should then be clearly smaller than the width of the comparator window.

In some applications, the sensor signal can be depressed in the maxima/minima regions. In order for this not to result in instances of faulty switching, an oscillator frequency is provided according to the invention which is not substantially higher than the sensor frequency, so that the window of the window comparator no longer follows the sensor signal but only tracks.

BRIEF DESCRIPTION OF THE DRAWINGS

An illustrative embodiment of the invention will be explained in more detail below with reference to the accompanying drawing, in which.

DESCRIPTION OF THE PREFERRED EMBODIMENTS

Figure 1:
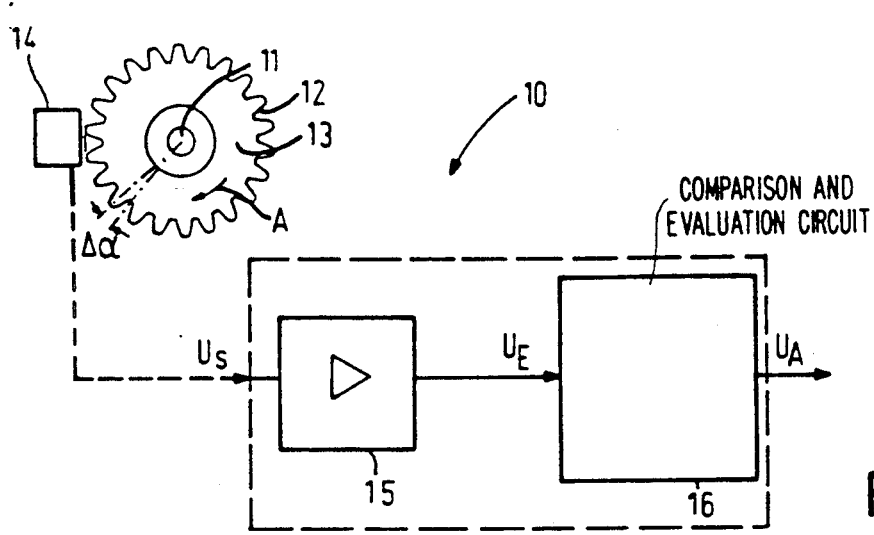
FIG. 1 shows the basic construction of a revolution-measuring apparatus according to the invention.

FIG. 1 shows the basic construction of a revolution-measuring apparatus 10 according to the invention. In order to establish the number of revolutions n of a shaft 11, for example, the axle of a motor vehicle wheel, there is arranged on the shaft 11 a toothed wheel 13, which is provided with a plurality of teeth 12 and rotates along with the shaft 11 in the direction of the arrow A. Consequently, the wheel rotates in a manner proportional to the number of revolutions n to be measured of the shaft 11. A sensor signal $U_S$, which is proportional to the number of revolutions n to be measured is generated via a revolution sensor 14 known per se. This sensor signal $U_S$ can be fed to an amplifier 15, at the output of which an input signal $U_E$ is available for a downstream comparison and evaluation device 16. The amplifier 15 is, for example, necessary if the revolution sensor 14 is provided with a magnetically operating sensor, since the latter generally delivers only a very small alternating voltage signal. Consequently, the input signal $U_E$ is an alternating voltage signal which is proportional to the sensor signal $U_S$ on which is superimposed a direct voltage (offset voltage). The comparison and evaluation device 16 is constructed in such a way that even in the case of large offset voltage tolerances and shifts, the alternating voltage signal, thereby raised or lowered, of the input signal $U_E$ is identified, and the digitized signal corresponding thereto is available as an output signal $U_A$ for further processing.

Figure 2:
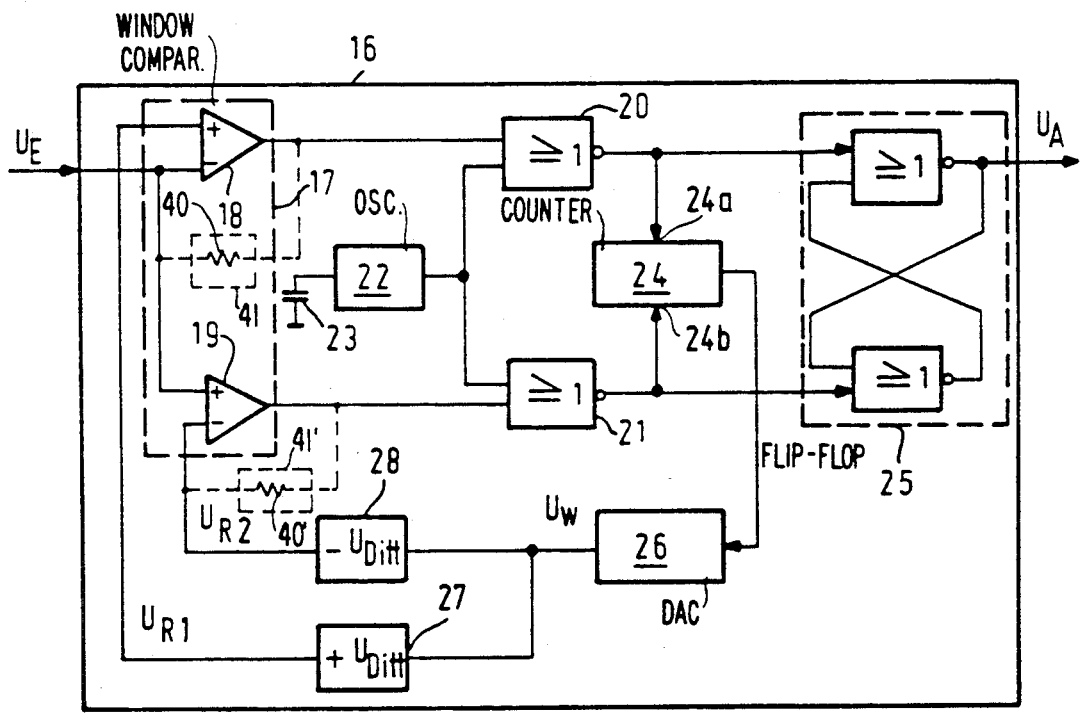
FIG. 2 shows the construction of a comparison and evaluation device according to the invention.

FIG. 2 shows the internal construction according to the invention of the comparison and evaluation device 16 in detail. A window comparator 17 is provided as the means for comparing the input signal $U_E$. The window comparator 17, comprises two comparators 18 and 19. The input signal $U_E$ is connected to the negative (inverting) input of the first comparator 18 and to the positive (non-inverting) input of the second comparator 19. The comparators 18 and 19 each have a further input which is supplied with different reference voltages $U_{R1}$ and $U_{R2}$, respectively. Downstream of the first comparator 18 is a first logic switching element 20, and downstream of the second comparator 19 is a second logic switching element 21. Preferably, these are first and second NOR gates 20 and 21, which are connected on the input side to an oscillator 22 which employs a capacitor 23 as a frequency-determining element. The oscillator 22 serves to generate a clock pulse which drives the counter 24 to count up or down depending on the condition of the NOR gates 20 and 21. The up-counting input 24a of the counter 24 is connected to the output of the first NOR gate 20, and the down-counting input 24b is connected to the output of the second NOR gate 21. The outputs of the NOR gates 20 and 21 are further connected to one input each of a flip-flop 25 at whose output the desired digitized sensor signal $U_S$ is available as the output signal $U_A$ for further processing. Downstream of the counter 24, on the output side, is a digital-to-analog converter (DAC) 26, whose output signal $U_W$ is fed to a first and a second adder 27 and 28, respectively.

A predetermined differential signal $U_{Diff}$ with a positive sign is added in the first adder 27 to the output signal $U_W$ of the DAC 26. The first reference voltage $U_{R1}$ generated in this way is present at the positive input of the first comparator 18 of the window comparator 17. The predetermined differential signal $U_{Diff}$ with a negative sign is added in the second adder 28 to the output signal $U_W$ of the DAC 26. The reference voltage $U_{R2}$ thereby generated at the output of the second adder 28 is connected to the negative input of the second comparator 19 of the window comparator 17. By means of the window comparator 17 and this evaluation circuit, it is possible to identify the maxima and minima of the sensor signal $U_S$, and to generate a corresponding digitized output signal $U_A$.

Figure 3:
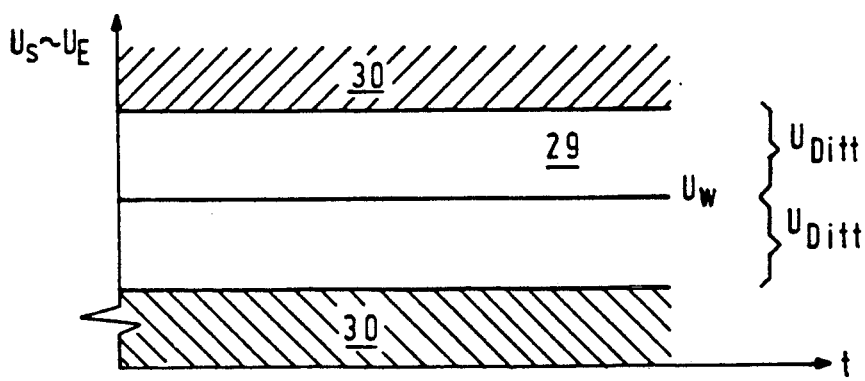
FIG. 3 shows the trackable window region according to the invention.

FIG. 3 shows a diagram, which basically represents the sensor signal $U_S$ as a function of time t and thus of the number of revolutions n. The diagram shows different window regions 29 and 30 of the window comparator 17 in which the counter 24 is activated (30) or not activated (29). The output signal $U_W$ of the DAC 26 then forms a level for determining the window region 29 by addition and subtraction of the differential signal $U_{Diff}$. In absolute terms, the magnitude of the differential signal $U_{Diff}$, and thus the magnitude of the window region 29 results from the functioning of the comparison and evaluation device 16, from the desired interference immunity with respect to disturbances, and finally from the minimum and maximum values, that is to say the extreme values of the sensor signal $U_S$.

In terms of function, the sensor signal $U_S$ is fed to the amplifier 15, which transmits it as an input signal $U_E$ to the window comparator 17. The first and second comparators 18 and 19 thereof contain different reference voltages $U_{R1}$ or $U_{R2}$, which are formed from the signal $U_W$, which is formed in turn from the counter content of the counter 24 via the DAC 26. To form the first reference voltage $U_{R1}$ of the first comparator 18, $U_W$ is increased by the differential signal $U_{Diff}$, and to form the second reference voltage $U_{R2}$ of the second comparator 19, $U_W$ is decreased by the differential signal $U_{Diff}$. When the arrangement is connected, various operating states are possible. If, finally, the sensor signal $U_S$ falls within the window region 29, the logic state ONE results at the outputs of the comparators 18 and 19, and no activity takes place. The clock pulse of the oscillator 22 then does not pass through the particular following stage. It is only if, finally, the sensor signal $U_S$ falls above or below the window region 29, i.e. in the window region 30, that the clock pulse of the oscillator passes on to the counter 24 via one of the NOR gates 20, 21. The counter 24 is then operative until the downstream DAC 26 delivers an output signal $U_W$ such that the sensor signal $U_S$ finally falls once again within the window region 29. The counter 24 receives additive counting signals via the first NOR gate 20 and negative counting signals via the second NOR gate 21, so that the window region can follow fluctuations (up or down) of the sensor signal $U_S$ in both directions. During further operation, a rising signal voltage $U_S$ leads to a pulse series at the up-counting input 24a of the counter 24, and a falling signal voltage $U_S$ leads to a corresponding signal at the down-counting input 24b of the counter 24. The change in direction at the maximum and minimum values of the signal voltage $U_S$ can therefore be detected with the simple flip-flop 25 which is reversed in each case with the first pulse of an oppositely directed pulse series.

With the apparatus according to the invention, consideration may be given advantageously in particular to disturbing influences which occur frequently in the applications mentioned at the beginning of this application. Thus, it is possible, for example, to avoid disturbances due to impulse-type spurious signals of the sensor signal $U_S$, which can arise, e.g. from vibration of the mechanical construction, and should not be allowed to lead to switching. The point is that the amplitude of these spurious signals is limited, so that with a correspondingly matched resolution of the window of the window comparator 17 and of the DAC 26, signals below a limiting value are not detected. Further, tendencies of the comparators 18 and 19 to oscillate in the case of very slow sensor signals lead to switching. In this case, a switching hysteresis can be provided by means of a regenerative resistor 40, 40' included in an optional feedback circuit 41, 41'. In order to avoid unintentional switching, the hysteresis should be clearly smaller than double the differential signal $U_{Diff}$. Under special conditions of application, the maximum and minimum values of the sensor signal $U_S$ can be depressed. With the present identification of extreme values, this can lead to undesired switching, which can, however, be met by the resolution of the window of the window comparator 17 and of the DAC 26. In the case of larger deformations, it may be necessary to set the frequency of the oscillator 22 so that the window of the comparator 17 no longer follows, but only tracks the sensor signal $U_S$. It should be noted here that it is advantageous for all named signal values to be electrical voltages.

The features of the invention which have been disclosed in the preceding description, in FIGS. 1, 2 and 3 and in the claims can be useful both individually and also in any combination for the implementation of the invention in its various embodiments.

I claim:

1. An adaptive revolution-measuring apparatus comprising, a revolution sensor for deriving a sensor signal and means for comparing and evaluating the sensor signal of the revolution sensor to generate a digital output signal corresponding thereto, wherein the means for comparing and evaluating comprise a window comparator with a controllable window, means for coupling the window comparator via at least one logic switching element to a flip-flop so as to drive the flip-flop to produce the digital output signal, and means coupled between an output of the window comparator and an input thereof for continuously generating and supplying corresponding first and second reference voltages to the input of the window comparator as a function of raised or lowered values of the sensor signal.

2. An adaptive measuring apparatus according to claim 1, wherein the window comparator comprises a first and second comparator each having an inverting input and a non-inverting input, an input signal proportional to the sensor signal being applied to the inverting input of the first comparator and to the non-inverting input of the second comparator, and wherein said first and second reference voltages are present at the non-inverting and inverting inputs, respectively, of the first and second comparators, respectively, and wherein said coupling means connect an output of the first and an output of the second comparator to a first and second logic switching element, respectively.

3. An adaptive measuring apparatus according to claim 2, wherein each logic switching element includes a NOR gate having an input connected to a respective one of the comparators and an output connected to a respective input of the flip-flop, and means connecting the input and the output of the NOR gates to the means for generating the reference voltages.

4. An adaptive measuring apparatus according to claim 3, wherein the means for generating the reference voltages comprise an oscillator which supplies the NOR gates with a clock pulse, an up-down counter coupled to a digital/analog converter (DAC), and a first and a second adder coupled to an output of the DAC, an up-counting input of the counter being connected to the output of the first NOR gate, and a down-counting counter input being connected to the output of the second NOR gate, the first adder adding to an output signal ($U_W$) of the DAC a predetermined differential signal ($U_{Diff}$) to supply said first reference voltage to the non-inverting input of the first comparator, and the second adder subtracting the differential signal ($U_{Diff}$) from the output signal ($U_W$) of the DAC to supply said second reference voltage to the inverting input of the second comparator.

5. An adaptive measuring apparatus according to claim 1, wherein the width of the window of the window comparator is limited in order to inhibit negative effects of impulse-type disturbances of an input signal ($U_E$) proportional to the sensor signal and applied to the input of the window comparator.

6. An adaptive measuring apparatus according to claim 5, wherein a regenerative resistor is coupled to the window comparator so as to provide a switching hysteresis which is smaller than the window region in order to inhibit oscillations of the comparator in the case of very low frequency sensor signals.

7. An adaptive measuring apparatus comprising:
an input terminal for receipt of a sensor signal,
an output terminal for supplying a digital output signal corresponding to a sensor signal at the input terminal,
a window comparator with a controllable window region adapted to bracket the sensor signal, a first input means coupled to the input terminal, a second input means and an output,
a logic circuit coupling said output of the window comparator to an input of a bistable circuit and to an input of a digital/analog converter (DAC),
a reference voltage generator coupled between an output of said DAC and said second input means of the window comparator and operative to supply a reference voltage thereto that varies as a function of the level of the sensor signal, and
means coupling an output of the bistable circuit to said output terminal to supply said digital output signal to the output terminal.

8. An adaptive measuring apparatus as claimed in claim 7 wherein.
the window comparator comprises first and second comparators each with first and second inputs that form said first and second input means of the window comparator, wherein the first and second inputs of the first and second comparators, respectively, are coupled to said input terminal and said second and first inputs of the first and second comparators, respectively, receive first and second reference voltages, respectively, from the reference voltage generator, one of said comparators being operative when the sensor signal rises a given amount above a reference voltage level and the other comparator being operative when the sensor signal drops a given amount below said reference voltage level, whereby said window comparator adapts itself so that the window region again brackets the sensor signal, and wherein
said logic circuit includes a first logic switching element coupled to an output of the first comparator and a second logic switching element coupled to an output of the second comparator.

9. An adaptive measuring apparatus as claimed in claim 8 wherein said reference voltage generator further comprises:
a clock pulse generator that controls said first and second logic switching elements,
an up-down counter having an up input coupled to an output of the first logic switching element and a down input coupled to an output of the second logic switching element, an output of the counter being coupled to said input of the DAC, and
said reference voltage generator includes first and second circuits which receive an output signal of DAC, said first circuit adding a given voltage to said output signal of the DAC to derive said first reference voltage and said second circuit subtracting a given voltage from said output signal of the DAC to derive said second reference voltage.

10. An adaptive measuring apparatus as claimed in claim 7 wherein said reference voltage generator further comprises:
a clock voltage generator that controls said logic circuit,
an up-down counter having an up input and a down input coupled to first and second outputs of the logic circuit, respectively, an output of the counter being coupled to the input of the DAC, and
first and second circuits which receive an output signal of the DAC, said first circuit adding a given voltage to said output signal of the DAC to derive a first reference voltage for the window comparator and said second circuit subtracting a given voltage from said output signal of the DAC to derive a second reference voltage for the window comparator.

11. An adaptive measuring apparatus as claimed in claim 7 wherein said logic circuit, said reference voltage generator and said DAC are part of a feedback circuit coupled between the output of the window comparator and the input means thereof, said feedback circuit being operative to adjust a reference voltage level of the window comparator so as to follow a change in level of the sensor signal.

12. An adaptive measuring apparatus as claimed in claim 11 wherein said logic circuit includes first and second NOR gates coupled between the output of the window comparator and up and down inputs of an up-down counter, said counter having it's output coupled to the input of the DAC.

* * * * *